Figure 1:
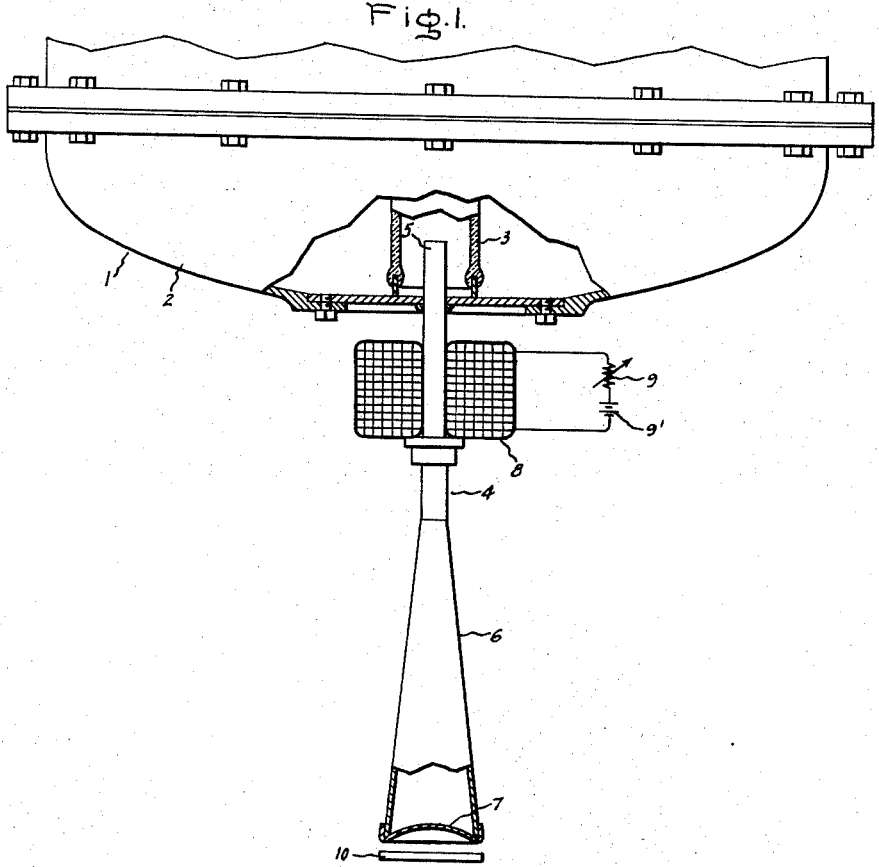

Oct. 28, 1958  E. J. LAWTON ET AL  2,858,259
ELECTRON IRRADIATION OF PREFORMED POLYAMIDE RESIN
Filed Dec. 6, 1952

Inventors:
Elliott J. Lawton,
Arthur M. Bueche,
by
Their Attorney.

United States Patent Office 2,858,259
Patented Oct. 28, 1958

2,858,259
ELECTRON IRRADIATION OF PREFORMED POLYAMIDE RESIN

Elliott J. Lawton and Arthur M. Bueche, Schenectady, N. Y., assignors to General Electric Company, a corporation of New York Application December 6, 1952, Serial No. 324,555

3 Claims. (Cl. 204—154)

This invention relates to the electron irradiation of polymeric materials and, more particularly to the electron irradiation of nylon.

Nylon is usually defined as any long-chain synthetic polymeric amide which has recurring amide groups as an integral part of the main polymer chain. Thus, nylon, refers to an entire family of polyamide resins which are generally products of the reaction of polybasic acids and polyfunctional amines carried out in such a way that predominately linear polymers are formed. One form of nylon, which is exemplary of the group, is produced from reacting adipic acid and hexamethylenediamine; other forms are well known to those familiar with the art. Nylon has found a variety of uses, e. g., in clothing, cord, gears, bearings, grommets, etc. Further description of nylon, its preparation, properties and uses can be found in the "Modern Plastics Encyclopedia," published by Plastics Catalogue Corporation of New York, New York (1949), pp. 262–264; in the text by Paul O. Powers entitled "Synthetic Resins and Rubbers," published by John Wiley and Sons, Inc. (1944), 1st edition, pp. 110–113; and in United States Patent Nos. 2,071,250 and 2,071,251, issued to Wallace H. Carothers on February 16, 1937, and assigned to E. I. du Pont de Nemours & Company, Wilmington, Delaware.

While nylon does not exhibit a progressive increase in plastic flow or loss of "form stability" to as great an extent as do many other plastic materials when the temperature is raised, its plastic deformation at elevated temperatures is sufficient to limit its usefulness in many applications such as bearing structures, gears, grommets, containers, cloth, etc. Moreover, its solubility in certain solvents seriously restricts its employment in places where exposure to such solvents is possible.

Principal objects of the present invention are the production of new polymeric products derived from the reaction of polybasic acids and polyfunctional amines. Further objects of this invention are the treatment of nylon to secure new products having greatly superior form stability and resistance to certain solvents.

Briefly stated, the present invention has as one of its principal aspects the irradiation of nylon with high energy electrons to obtain new products having enhanced solvent resistance and reduced susceptibility to plastic flow.

Figure 2:
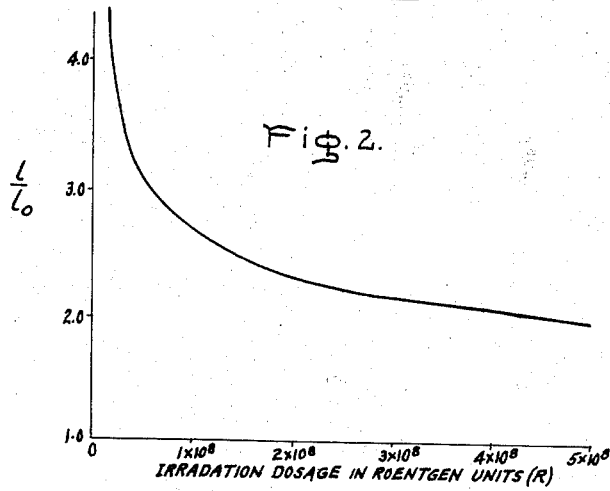

The features of the invention desired to be protected herein are pointed out with particularity in the appended claims. The invention itself, together with further objects and advantages thereof, may best be understood by reference to the following description taken in connection with the accompanying drawings in which:

Fig. 1 is a partially sectionalized, simplified view of accelerator apparatus useful in connection with the invention; and Fig. 2 is a graph useful in presenting the invention.

Referring particularly to Fig. 1, there is shown high voltage accelerating apparatus 1 capable of producing a beam of high energy electrons for irradiating nylon materials in accordance with the invention. High voltage accelerating apparatus 1 may be of the type disclosed in United States Patent No. 2,144,518, patented by Willem F. Westendorp on January 17, 1939, and assigned to the assignee of the present invention. In general, this apparatus comprises a resonant system having an openmagnetic circuit inductance coil (not shown) which is positioned within a tank 2 and energized by a source of alternating voltage to generate a high voltage across its extremities. At the upper end (not shown) of a sealedoff, evacuated, tubular envelope 3 is located a source of electrons which is maintained at the potential of the upper extremity of the inductance coil whereby a pulse of electrons is accelerated down envelope 3 once during each cycle of the energizing voltage when the upper extremity of the inductance coil is at a negative potential with respect to the lower end. Further details of the construction and operation of high voltage accelerating apparatus 1 may be found in the aforementioned Westendorp patent and in "Electronics," vol. 17, pp. 128–133 (1944).

To permit utilization of the high energy electrons accelerated down envelope 3, there is provided an elongated metal tube 4, the upper portion 5 of which is hermetically sealed to tank 2, as illustrated, by any convenient means such as silver solder. The lower portion 6 of tube 4 is conical in cross-section to allow an increased angular spread of the electron beam. The emergence of high energy electrons from tube 4 is facilitated by an endwindow 7 which may be hermetically sealed to tube 4 by means of silver solder. End-window 7 should be thin enough to permit electrons of desired energy to pass therethrough but thick enough to withstand the force of atmospheric pressure. Stainless steel of about 0.002 inch thickness has been found satisfactory for use with electron energies of about 230,000 electron volts or greater. Beryllium and other materials of low stopping power may also be employed with efficacy. By forming end-window 7 in arcuate shape as shown, greater strength for resisting the force of atmospheric pressure may be obtained for a given window thickness. Desired focusing of the accelerated electrons may be secured by a magnetic-field generating winding 8 energized by a source of direct current 9' through a variable resistor 9.

In producing the desired solvent and deformation resistant materials according to the invention, a sheet 10 of nylon material is supported in the path of the electrons emerging from end-window 7 as illustrated. The high energy electrons penetrate the nylon material to a depth dependent upon their energy and effect modifications in the properties of the material. Of course, sheet 10 can be in the form of strip material which is passed continuously under end-window 7 at a velocity selected to give the desired irradiation dosage. Various expedients for obtaining the irradiation of the polymeric materials in other shapes (such as containers, bottles, threads, cloth, etc.) and states will be apparent to those skilled in the art. Uniform treatment of nylon materials having appreciable thickness can be assured by irradiating them first from one side and then the other, or from both sides simultaneously. In certain instances it may be desirable to irradiate the nylon materials in an atmosphere of nitrogen, argon, helium, krypton or xenon, etc., to prevent effects from any corona which may be present.

Nylon materials irradiated with high energy electrons according to the present invention exhibit a marked increase in their resistance to solubility in solvents such as p-cresol, formic acid, phenol, hot formamide, cold concentrated hydrochloric acid, etc., such solvents being referred to hereinafter merely as "solvents." The extent of such solvation improvement is illustrated in the graph of Fig. 2 wherein the ratio $I/I_0$ is plotted against irradiation dosage in roentgen units with irradiation dosages up to $5 \times 10^8$ roentgen units being illustrated. A roentgen unit (R) as usually defined, is the amount of radiation that produces one electrostatic unit of ion pairs per milliliter of dry air under standard conditions and, as employed here, refers to the amount of electron radiation measured with an air equivalent ionization chamber at the position of the upper surfaces of the nylon materials. The parameter $l_0$ is the length of the irradiated nylon before immersion in a solvent and $l$ is the length of the irradiated nylon after immersion in a solvent for a period sufficiently long so that further changes are negligible. The particular exemplary curve of Fig. 2 was obtained with 3.4 mil sheets of nylon sold by E. I. du Pont de Nemours & Company, Inc., Wilmington, Delaware, under the code number 66, which is a polyamide produced from hexamethylene diamine and adipic acid. The samples were strips about 1x¼ inches which were irradiated at the several dosages indicated, placed into test tubes filled with p-cresol, and inserted into an oven, the temperature of which was maintained at 90° C. The lengths of the strips were measured before and after immersion in the solvent to obtain the lengths $l_0$ and $l$, respectively.

As is manifest from Fig. 2, the irradiated nylon strips did not dissolve in p-cresol at the plotted irradiation dosages, but merely swelled. Moreover, the amount of swelling decreased as the irradiation dosage was increased; hence the irradiation reduces the amount of swelling of nylon in a "swelling agent." The nylon strips that had been given an irradiation dosage of at least about $5 \times 10^7$R did not dissolve in the p-cresol, whereas the unirradiated and those irradiated at dosages below about $5 \times 10^7$R all dissolved readily. Accordingly, it is seen that the solubility of nylon materials is markedly decreased by irradiation with dosages above about $5 \times 10^7$R. The lowest dosage at which the nylon first becomes measurably insoluble is affected somewhat by the polymeric molecular weight before irradiation to the extent that, as nylon materials having higher original molecular weights are employed, the same solvent resistance is produced at lower dosages. However, for all nylon materials, the minimum dosage at which measurable insolubility can be produced is of the order of $5 \times 10^7$R. The irradiation of nylon materials has been found to increase substantially the molecular weight; thus, the final molecular weights (after irradiation) are substantially higher than the originals (before irradiation).

The reduced susceptibility of the nylon materials to plastic flow and their improved form stability was evident from visual observation of changes in shape as the temperature was increased for irradiated and unirradiated samples. Unirradiated samples of the above-identified nylon 66 were found to flow appreciably at 250° C. while, for example, samples irradiated with about $1 \times 10^8$R did not flow even at temperatures as high as 390° C.

From the foregoing, it is readily apparent that electron irradiation of nylon materials in accordance with the invention increases the solvent resistance and form stability of the materials. Pre-formed articles of nylon should be essentially strain-free in order for the irradiation to insure retention of shape at the highest temperatures. Irradiated nylon materials produced in accordance with the invention may be employed as insulation for electrical conductors, gaskets, containers, clothing, linings, etc., all exhibiting the improved insolubility and infusibility described hereinbefore. Alternatively, the same types of manufactured articles of commerce may be molded to shape and thereafter subjected to irradiation with high energy electrons to obtain the enhanced properties. With the improved form stability at elevated temperatures obtained according to the invention, it is possible to take advantage of the outstanding electrical characteristics of nylon in much higher temperature applications than heretofore possible. Moreover, nylon materials irradiated according to the invention may now be used in applications, such as fluid conduits, where heretofore they could not be because of the presence of solvents or high temperatures. It will be readily realized that other forms of electron accelerating apparatus may be employed instead of high voltage accelerating apparatus 1. For example, linear accelerators of the type described by J. C. Slater in the "Reviews of Modern Physics," vol. 20, No. 3, pp. 473–518 (July 1948) may be utilized. In general, the energy of the electrons employed in the practice of the invention may range from about 50,000 electron volts to 20 million electron volts or higher, depending upon the depth to which it is desired to affect the properties of the polymeric nylon materials. For example, by properly adjusting the intensity of the electrons in relation to the thickness of the material being irradiated, a "case hardening" effect can be obtained, i. e., the exterior portion of an article can be irradiated while the interior remains essentially unirradiated. To decrease wasteful energy absorption between the point of exit of electrons from the accelerating apparatus and the polymeric nylon materials, a vacuum chamber having thin entrance and exit windows may be inserted in the space.

While the present invention has been described by reference to particular embodiments and examples thereof, alternatives will readily occur to those skilled in the art. It is, therefore, intended in the appended claims to cover all such equivalents as may be within the true spirit and scope of the foregoing description.

The units employed above for measuring the high energy radiation have been designated as roentgen units. Alternatively, in place of roentgen units, one can employ the term "roentgen equivalent physical," or, more briefly "rep."

What we claim as new and desire to secure by Letters Patent of the United States is:

1. The process for reducing the solubility of a preformed polyamide resin in hot para-cresol and reducing its susceptibility to plastic flow at temperatures above 250° C., which process comprises irradiating the preformed polyamide resin with primary radiation consisting essentially of high energy electrons emanating from a high voltage accelerating apparatus in which the electrons have energies of from about 50,000 to 20,000,000 electron volts, said irradiation being carried out within the dose range of from $5 \times 10^7$ rep. to $5 \times 10^8$ rep.

2. A preformed polyamide resin of reduced solubility in hot para-cresol and of reduced susceptibility to plastic flow at temperatures above 250° C. obtained in accordance with the process described in claim 1.

3. An article of manufacture having reduced solubility in hot para-cresol and reduced susceptibility to plastic flow at temperatures above 250° C. consisting essentially of a preformed polyamide resin irradiated in accordance with the process described in claim 1.

References Cited in the file of this patent

UNITED STATES PATENTS 2,130,948    Carothers _____ Sept. 20, 1938

FOREIGN PATENTS 665,262    Great Britain _____ Jan. 23, 1952

OTHER REFERENCES

"The Science and Engineering of Nuclear Power," page 250. Published by Addeson-Wesley Press Inc., Cambridge 42, Mass., 1947.

Lapp et al.: "Nuclear Radiation Physics," pages 433–439, Prentice-Hall, Inc., New York city, 1948.

"Ind. and Eng. Chem.," vol. 45, pages 11A and 13A, September 1953.

U. S. Atomic Energy Commission, O. R. N. L. 928. By O. Sissman and C. D. Bopp, June 29, 1951. (Available from A. E. C., Oak Ridge, Tennessee), pages 8–12, 98–106.